UNITED STATES PATENT OFFICE.

GEORGE V. FRYE AND FRANK B. HINKSON, OF LEXINGTON, OHIO, SAID HINKSON ASSIGNOR TO SAID FRYE.

PROCESS OF MAKING BUTTER.

No. 888,076.          Specification of Letters Patent.          Patented May 19, 1908.

Application filed October 26, 1907. Serial No. 399,274.

*To all whom it may concern:*

Be it known that we, GEORGE V. FRYE and FRANK B. HINKSON, citizens of the United States, residing at Lexington, in the county of Richland and State of Ohio, have invented new and useful Improvements in Processes of Making Butter, of which the following is a specification.

The invention relates to an improved process of treating milk in butter making, whereby to materially improve the quality and quantity of the product.

In the ordinary methods of butter making the milk is separated, the resultant cream ripened by the use of butter culture, and the material so produced is churned to collect the fat globules. The ripening, or practical souring of the cream is absolutely essential in all commercially effective butter making processes now known, and as the quality and flavor of the product depends largely upon churning the cream at exactly the proper point in the ripening process, the best results require extreme care and expert knowledge.

The present process is directed primarily to dispensing entirely with the ripening of the cream, and broadly stated, consists in subjecting sweet cream to the action of the electric current immediately preceding the churning operation. In thus subjecting the cream to the action of the electric current it has been found that more or less heat is imparted to the material, and that by virtue of such heat the proper separation of the butter fats held in solution is to some degree retarded. Therefore, particularly in view of the fact that unripened cream is utilized as the material, an important and essential step of the present process is the initial reduction of the temperature of the cream to such a degree that the subsequent electrolytic action will not raise the temperature of the material to a point beyond that best adapted for the proper gathering or separation of the butter fat held in solution.

In carrying out the process, the cream, which has been initially treated to reduce the temperature, is subjected to an electrolytic action, the current strength and duration of which depends upon the percentage of butter fat in the material being treated. After the electrolytic action is maintained for the desired length of time, the material is delivered directly to the churn in which the fat globules are massed in the usual manner.

As one simple form of carrying out the process, it may be stated that the sweet cream of the desired temperature is delivered to a tank in which are removably mounted a series of electrodes, preferably so constructed as to permit the flow of the material below them. These electrodes may be in any number and any desired distance apart, both of which details depend primarily upon the specific nature of the particular material being treated. We have found by experiment that the process is equally effective under ordinary conditions by connecting the electrodes in series, in parallel, or in bi-polar arrangement, the essential and necessary characteristic being that the entire quantity of the material be thoroughly subjected to electrolytic action.

The effect of the current on the milk is primarily to separate and mass in globule form the butter fats held in solution, therefore, adding these heretofore lost solids to the butter fats held in suspension. This is so particularly noticeable in carrying out the process that the butter fats will be found to collect on the positive electrodes, massing themselves in butter form, and in fact exactly and directly making butter in the electrolytic receptacle. Therefore, the process of butter making, as theoretically considered, is complete by the electrolytic action, though we prefer to additionally churn the material in order to permit a proper working and finishing of the product in a commercial way.

The essential differences of the present process over those heretofore practiced, are, first, the use of entirely sweet cream without any ripening whatever, and, second, the cooling of the cream, and third, the subjecting of such cream to an electrolytic action. It is, therefore, to be understood that we consider as within the scope of our invention the use of any known method of or apparatus for inducing the necessary electrolytic action, and that we limit ourselves in the present process only to the use of the electric current for treating cooled and unripened material as a preincident to the churning operation in the process of butter making.

Having thus described the invention what is claimed as new, is:—

1. The herein described process of butter making consisting in reducing the temperature of the material, subjecting the same to an electrolytic action, and finally churning the material.

2. The herein described process of butter making consisting in cooling unripened cream, subjecting the same to an electrolytic action, and churning the same.

3. The herein described process of making butter consisting in subjecting cream to a cooling operation and then electrolyzing the product.

4. The herein described process of making butter consisting in subjecting unripened cream to a cooling operation and then electrolyzing the product.

In testimony whereof we affix our signatures in presence of two witnesses.

GEO. V. FRYE.
FRANK B. HINKSON.

Witnesses:
J. W. GERNER,
E. E. WARFIELD.